United States Patent
Strauser

(10) Patent No.: US 10,219,508 B1
(45) Date of Patent: Mar. 5, 2019

(54) DOE URINE HEATER DEVICE

(71) Applicant: Benjiman Strauser, Cadet, MO (US)

(72) Inventor: Benjiman Strauser, Cadet, MO (US)

( * ) Notice: Subject to any disclaimer, the term of this patent is extended or adjusted under 35 U.S.C. 154(b) by 27 days.

(21) Appl. No.: 15/272,223

(22) Filed: Sep. 21, 2016

(51) Int. Cl.
*A01M 31/00* (2006.01)

(52) U.S. Cl.
CPC .................. *A01M 31/008* (2013.01)

(58) Field of Classification Search
CPC .... A01M 31/008; A01M 29/12; A01M 31/00; A61L 9/03; A61L 2209/135; A61L 9/02
USPC .............................. 43/1, 2; 392/393, 403, 405
See application file for complete search history.

(56) References Cited

U.S. PATENT DOCUMENTS

| | | | |
|---|---|---|---|
| 4,771,563 A * | 9/1988 | Easley | A01M 31/008 219/521 |
| 4,937,431 A | 6/1990 | Jameson et al. | |
| 5,094,025 A | 3/1992 | Daniels | |
| 5,429,271 A * | 7/1995 | Porter | A01M 1/2077 222/146.5 |
| 6,443,434 B1 | 9/2002 | Prather | |
| 6,655,604 B2 | 12/2003 | Tuttobene, Jr. | |
| 7,040,548 B2 | 5/2006 | Rodgers | |
| 7,108,199 B1 * | 9/2006 | Brown | A01M 1/2038 222/642 |
| 7,210,812 B1 * | 5/2007 | Linton | A01M 31/008 362/183 |
| 7,438,873 B2 | 10/2008 | Saxon et al. | |
| 9,185,904 B1 | 11/2015 | Kuhn et al. | |
| 9,751,660 B2 * | 9/2017 | Jasin | B65D 21/086 |
| 2004/0009103 A1 * | 1/2004 | Westring | A01M 1/2033 422/125 |
| 2010/0270943 A1 * | 10/2010 | Cook | A61L 9/03 315/291 |

* cited by examiner

*Primary Examiner* — Kathleen I Alker
*Assistant Examiner* — Jeffrey R Larsen

(57) ABSTRACT

A doe urine heater device provided to increase the attraction of deer to a hunting area by including a box having hingedly connected top and bottom portions, an upper central compartment in the top portion and a portion of the bottom portion directly adjacent thereto. A heating bulb, for heating doe urine contained in a urine cup centrally disposed in the box directly above the heating bulb, is disposed within a lower central compartment in the bottom portion directly adjacent to the upper central compartment and adjacent a bottom side of the box. A battery-operated variable temperature control switch, disposed proximal a top side of the box within an upper compartment disposed within the top portion between the upper central compartment and each of a right side and a left side of the box, is in operational communication with the heating bulb to selectively heat the doe urine.

1 Claim, 4 Drawing Sheets

DOE URINE HEATER DEVICE

BACKGROUND OF THE INVENTION

Various types of animal attractant and scent distribution devices are known in the prior art. However, what is needed, and what the present device provides, is a doe urine heater device which simulates the presence of a doe in a hunting area for a period of time by maintaining the doe urine in a heated state within a holder, rather than by dumping cold doe urine on the ground.

FIELD OF THE INVENTION

The present invention relates to animal attractant and scent distribution devices, and more particularly, to a doe urine heater device.

SUMMARY OF THE INVENTION

The general purpose of the present doe urine heater device, described subsequently in greater detail, is to provide a doe urine heater device which has many novel features that result in a doe urine heater device which is not anticipated, rendered obvious, suggested, or even implied by prior art, either alone or in combination thereof.

To accomplish this, the present doe urine heater device is provided to increase the attraction of both bucks and other does to a hunting area over the attraction provided by spreading cold doe urine on the ground. The instant device includes a box having hingedly-connected top and bottom portions. An upper central compartment 38 is disposed in the top portion and a portion of the bottom portion directly adjacent the top portion. A lower central compartment is disposed in the bottom portion in a position directly adjacent to the upper central compartment and between the upper central compartment and the bottom side. A heating bulb is disposed within a lower central compartment disposed in the bottom portion directly adjacent to the upper central compartment and between the upper central compartment and a bottom side of the box. The heating bulb is configured to heat an amount of doe urine contained within a urine cup removably disposed with the upper central compartment directly above the heating bulb to a temperature within a normal body temperature range of a doe. The heating bulb is an 1157 bulb which serves at the heat source for heating doe urine contained in a urine cup. A battery-operated variable temperature control switch, disposed proximal a top side of the box within one of an upper compartment disposed within the top portion between the upper central compartment and each of a right side and a left side of the box, is in operational communication with the heating bulb to selectively heat the doe urine. A charger, which is a 6-volt deep cycle triple charger, is provided to charge the at least one battery. The urine cup has a diameter in a range of approximately 2 inches to 4 inches and has a depth of approximately 2 inches to 4 inches. The temperature control switch is configured to selectively control the heating bulb. Thus has been broadly outlined the more important features of the present doe urine heater device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
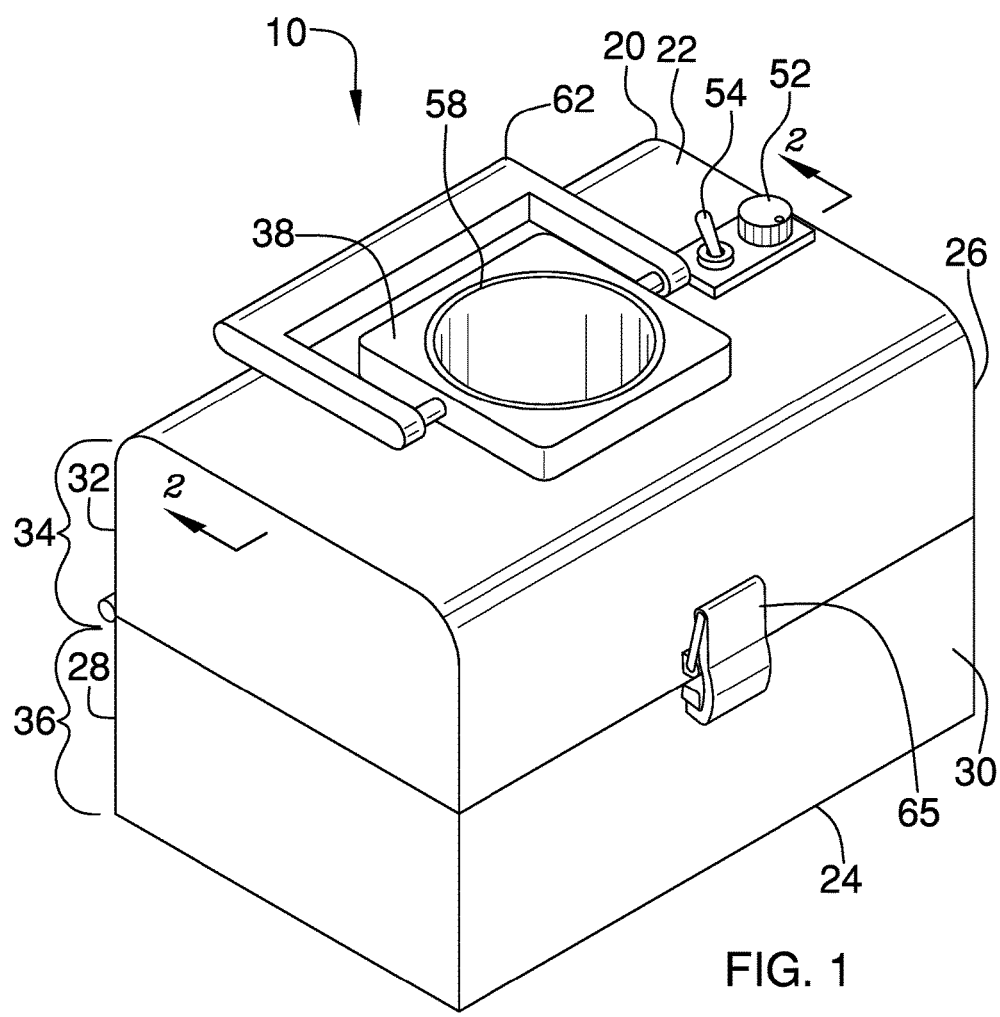
FIG. 1 is a front isometric view.
Figure 2:
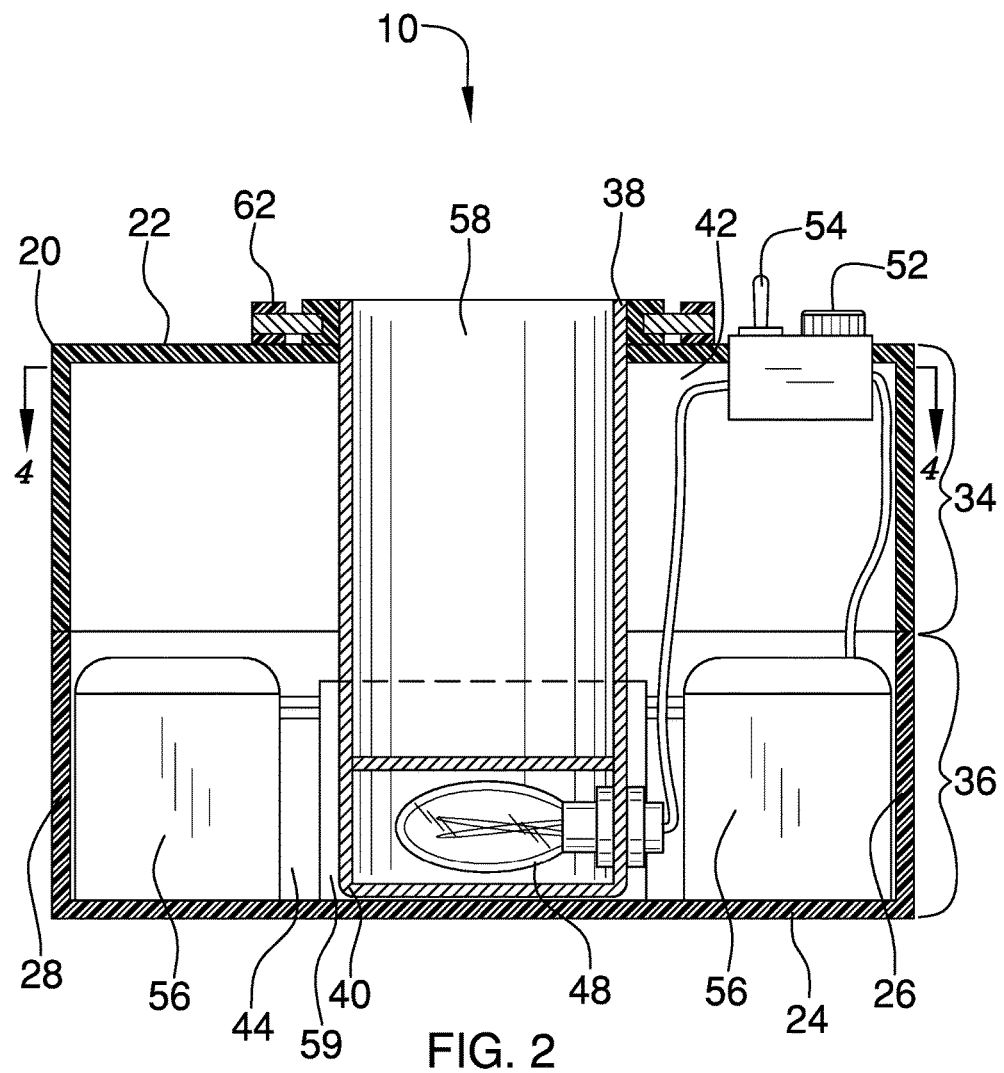
FIG. 2 is a cross-sectional view taken along line 2-2 of FIG. 1.
Figure 3:
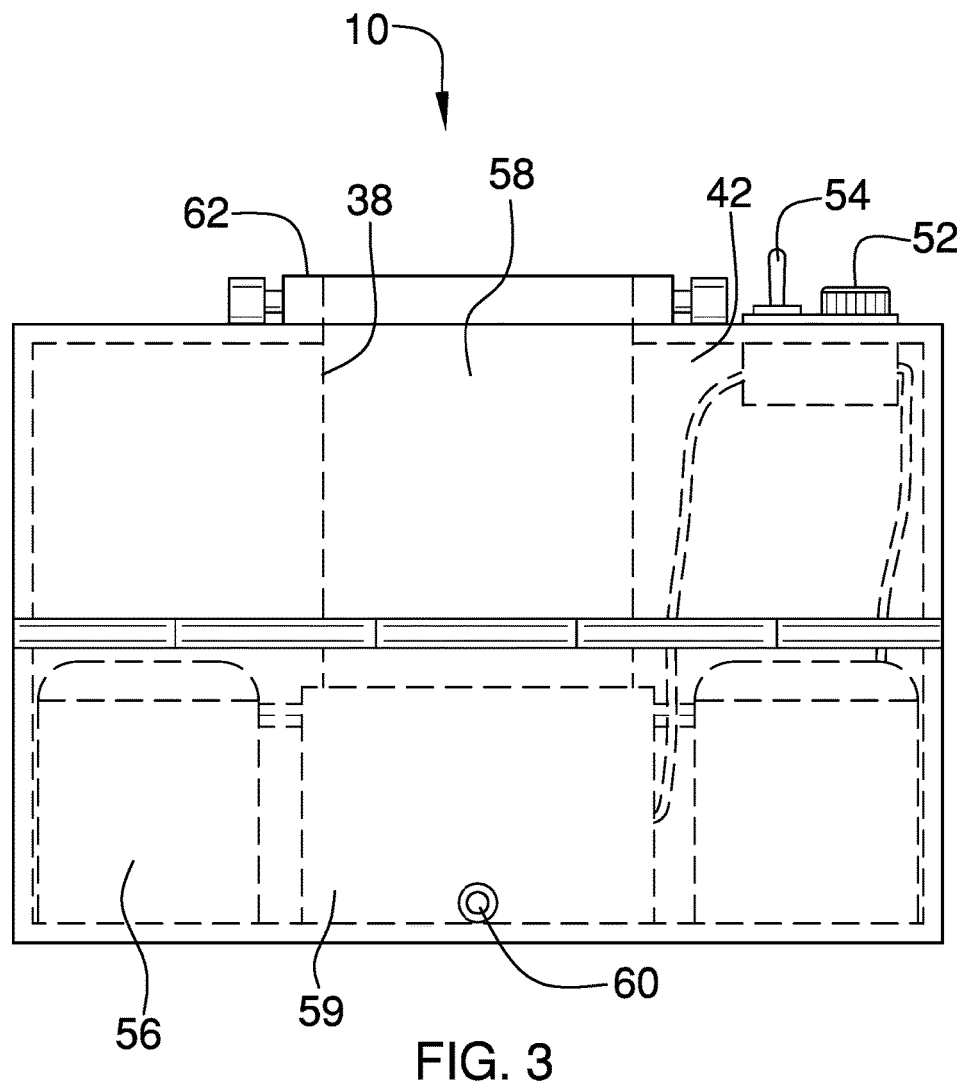
FIG. 3 is a rear elevation view.
Figure 4:
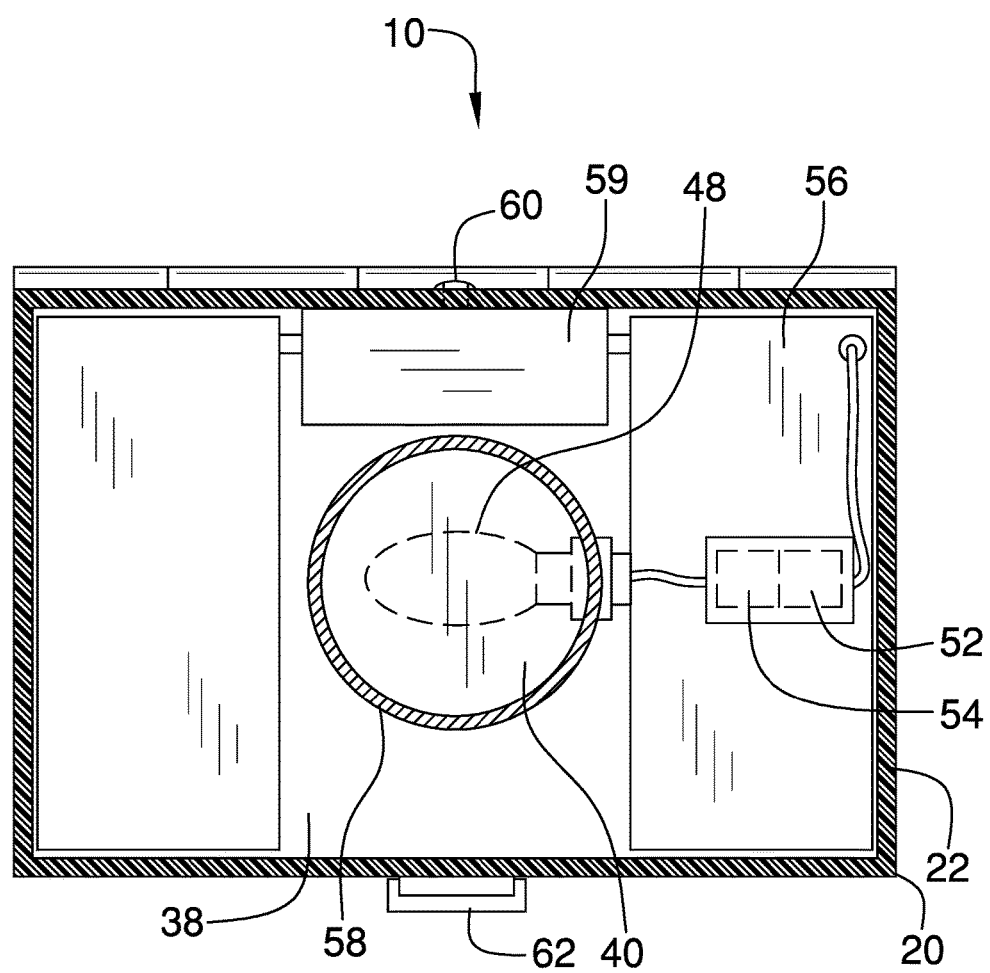
FIG. 4 is a top plan view.

With reference now to the drawings, and in particular FIGS. 1 through 4 thereof, an example of the instant doe urine heater device employing the principles and concepts of the present doe urine heater device and generally designated by the reference number 10 will be described.

Referring to FIGS. 1 through 4, the present doe urine heater device 10 is illustrated. The doe urine heater device 10 includes a box 20 having a top side 22, a bottom side 24, a right side 26, a left side 28, a front side 30, a rear side 32, a top portion 34, and a bottom portion 36 hingedly attached to the top portion 34 on rear side 32. An upper central compartment 38 is disposed in the top portion 34 and a portion of the bottom portion 36 directly adjacent the top portion 34. A lower central compartment 40 is disposed in the bottom portion 36 in a position directly adjacent to the upper central compartment 38 and between the upper central compartment 38 and the bottom side 24. An upper compartment 42 is disposed within the top portion 34 between the upper central compartment 38 and each of the right side 26 and the left side 28. A lower compartment 44 is disposed within the bottom portion 36 between a portion of the upper central compartment 38 and the lower central compartment 40 and each of the right side 26 and the left side 28.

A heating bulb 48 is disposed within the lower central compartment 40. The heating bulb 48 is configured to heat an amount of doe urine to a temperature in a range of 37.2 degrees Celsius (98.96 degrees Farenheit) to 39.4 degrees Celsius (102.92 Farenheit). A variable temperature control switch 52 is disposed with one of the upper compartments 42 proximal the top side 22. The variable temperature control switch 52 is in operational communication with the heating bulb 48. An on-off switch 54 is disposed on the top side 22 proximal to and in operational communication with each of the temperature control switch 52 and the heating bulb 48. At least one battery 56 is disposed in a respective one of the lower compartments 42. The at least one battery 56 is in operational communication with the temperature control switch 52. The battery 56 is rechargeable. A urine cup 58 is removably disposed within the upper central compartment 38 directly above the heating bulb 48. The urine cup 58 is configured to contain the amount of doe urine therein. A charger 59 disposed within one of the lower compartments 42 proximal the at least one battery 56 is provided to charge the at least one battery 56. A charger port 60 is in operational communication with the charger 59.

A pivotable handle 62 is disposed on the top side 22 of the box 20. A lock member 65 disposed on the front side 30 of the box 20 and is configured to secure the top portion 34 to the bottom portion 36. The temperature control switch 52 is configured to selectively control the heating bulb 48 and permit the heating bulb 48 to heat the doe urine within the urine cup 58 to a temperature within the normal temperature range of a doe.

What is claimed is:
1. A doe urine heater device comprising:
   a box having a top side, a bottom side, a right side, a left side, a front side, a rear side, a top portion, and a bottom portion hingedly attached to the top portion on the rear side;

an upper central compartment disposed in the top portion and a portion of the bottom portion directly adjacent the top portion;

a lower central compartment disposed in the bottom portion in a position directly adjacent to the upper central compartment and between the upper central compartment and the bottom side;

a pair of upper compartments, each upper compartment being disposed within the top portion between the upper central compartment and a respective one of the right side and the left side;

a pair of lower compartments, each lower compartment being disposed within the bottom portion between a portion of the upper central compartment and the lower central compartment and a respective one of the right side and the left side;

a heating bulb disposed within the lower central compartment, the heating bulb being configured to heat an amount of doe urine to a temperature in a range of 37.2 degrees Celsius to 39.4 degrees Celsius;

a variable temperature control switch disposed within one of the pair of upper compartments, the variable temperature control being positioned proximal the top side, the variable temperature control switch being in operational communication with the heating bulb;

an on-off switch disposed on the top side proximal to and in operational communication with each of the temperature control switch and the heating bulb;

a pair of batteries, each battery being disposed in a respective one of the lower compartments, each battery being in operational communication with the temperature control switch;

a urine cup removably disposed within the upper central compartment in a position directly above the heating bulb, the urine cup being configured to contain an amount of doe urine therein;

a charger disposed within the box, the charger being configured to charge each battery;

a charger port directly adjacent the charger, the charger port being in operational communication with the charger;

a pivotable handle disposed on the top side of the box; and a lock member disposed on the front side of the box, the lock member configured to secure the top portion to the bottom portion;

wherein the temperature control switch is configured to selectively control the heating bulb and permit the heating bulb to heat the doe urine contained within the urine cup to a temperature within a normal body temperature range of a doe; and wherein the battery is rechargeable.

\* \* \* \* \*